United States Patent
Aube

(10) Patent No.: US 10,625,548 B2
(45) Date of Patent: Apr. 21, 2020

(54) HI-RAIL DEVICE

(71) Applicant: TECHNOLOGIE CONTINENTAL RAILWORKS I INC. / CONTINENTAL RAILWORKS TECHNOLOGY I INC., Saint-Laurent (CA)

(72) Inventor: Francois Aube, Montreal (CA)

(73) Assignee: TECHNOLOGIE CONTINENTAL RAILWORKS I INC., Saint-Laurent (CA)

(*) Notice: Subject to any disclaimer, the term of this patent is extended or adjusted under 35 U.S.C. 154(b) by 352 days.

(21) Appl. No.: 15/792,846

(22) Filed: Oct. 25, 2017

(65) Prior Publication Data

US 2018/0118236 A1 May 3, 2018

Related U.S. Application Data

(60) Provisional application No. 62/414,845, filed on Oct. 31, 2016.

(51) Int. Cl.
| | |
|---|---|
| *B60F 1/04* | (2006.01) |
| *B61D 15/00* | (2006.01) |
| *B60F 1/00* | (2006.01) |
| *B61K 5/02* | (2006.01) |

(52) U.S. Cl.
CPC ............... *B60F 1/04* (2013.01); *B60F 1/005* (2013.01); *B61D 15/00* (2013.01); *B61K 5/02* (2013.01); *B60F 2301/10* (2013.01)

(58) Field of Classification Search
CPC ........ B60F 1/005; B60F 1/04; B60F 2301/10; B61D 15/00; B61K 5/02

USPC ................................. 105/72.2, 215.1, 215.2
See application file for complete search history.

(56) References Cited

U.S. PATENT DOCUMENTS

| | | | | |
|---|---|---|---|---|
| 3,704,671 A | * | 12/1972 | Horne, Jr. ................. | B60F 1/00 105/215.2 |
| 3,738,285 A | * | 6/1973 | Olson, Sr. ............... | B60F 1/005 105/72.2 |
| 3,763,789 A | * | 10/1973 | Olson, Sr. ............... | B60F 1/005 105/72.2 |
| 3,804,025 A | * | 4/1974 | Elliott .................... | B60F 1/005 105/72.2 |
| 3,980,025 A | * | 9/1976 | Olson, Sr. ............... | B60F 1/043 105/72.2 |
| 5,018,453 A | * | 5/1991 | Kinard .................... | B60F 1/00 105/72.2 |

(Continued)

*Primary Examiner* — Zachary L Kuhfuss
(74) *Attorney, Agent, or Firm* — Benoit & Cote, Inc.; Mathieu Miron

(57) ABSTRACT

There is described a hi-rail device comprising a cam assembly, an axle assembly and a locking pin. The cam assembly comprises a guiding slot which comprises a plurality of contiguous segments extending as a broken line, e.g., in a flattened M shape, wherein a first one and a last one of the contiguous segments extend in a downward slope with respect to a horizon. The locking pin inserted in the guiding slot and movable in translation within the guiding slot in which it is inserted. The axle assembly, in which the locking pin is inserted, has a weight applied on the locking pin which locks the locking pin in the lower end or the upper end of the guiding slot if the locking pin is in the first one or the last one of the four contiguous segments and no other force is applied thereonto.

20 Claims, 11 Drawing Sheets

(56) References Cited

U.S. PATENT DOCUMENTS

| | | | | |
|---|---|---|---|---|
| 5,586,507 A | * | 12/1996 | Madison | B60F 1/005 |
| | | | | 105/215.2 |
| 9,096,107 B2 | * | 8/2015 | Bodell | B60F 1/043 |
| 2005/0217532 A1 | * | 10/2005 | Conneally | B60F 1/04 |
| | | | | 105/215.1 |
| 2018/0118236 A1 | * | 5/2018 | Aube | B60F 1/005 |
| 2018/0370309 A1 | * | 12/2018 | Hazrati-Ashtiani | B60F 1/043 |
| 2019/0263205 A1 | * | 8/2019 | Mascola | B60F 1/04 |

* cited by examiner

HI-RAIL DEVICE

CROSS-REFERENCE TO RELATED APPLICATIONS

This application claims priority of U.S. provisional patent application 62/414,845 filed on Oct. 31, 2016, the specification of which is hereby incorporated by reference.

BACKGROUND

(a) Field

The subject matter disclosed generally relates hi-rail vehicles, also known as road-rail vehicles. More specifically, it relates to a device to be installed on a road vehicle for driving on rails.

(b) Related Prior Art

Hi-rails are vehicles known to be operable on both rail tracks and road, hence their name: hi-rail, high-rail, or road-rail vehicles.

In practice, hi-rail vehicles are often normal road vehicles, such as a pick-up truck, heavy truck or a specialized vehicle (tractor, excavator, etc.), converted into a hi-rail by adding a hi-rail device to the vehicle to allow the vehicle to drive on rail tracks.

As for other transportation means, safety issues are taken seriously and various aspects of hi-rail devices need to be improved to ensure maximum safety to the drivers of hi-rails. Improved design simplicity and ease of use are also contemplated.

SUMMARY

According to an aspect of the invention, there is provided a hi-rail device comprising:
- a cam assembly for mounting on a vehicle, the cam assembly comprising a guiding slot, the guiding slot comprising two end segments having a downward slope with respect to a horizon;
- a locking pin movable in translation within the guiding slot in which it is inserted, the locking pin being lockable by weight in the two end segments of the guiding slot;
- a hydraulic cylinder, pivotally connected to a fixed point on the cam assembly and fixedly connected to the locking pin to provide a translation movement thereto; and
- an axle assembly for holding wheels, the axle assembly being pivotally connected at a connection pin on the cam assembly, the axle assembly comprising an axle locking slot through which the locking pin is inserted to drive the axle assembly in rotation with respect to the connection pin on the cam assembly when the locking pin undergoes the translation movement.

According to an embodiment, the guiding slot comprises four contiguous segments, sequentially: a lower one of the end segments, namely a lower detent segment, a lower coupling segment, an upper coupling segment and an upper one of the end segments, namely an upper detent segment, each pair of adjacent segments extending in different directions.

According to an embodiment, the fixed point on the cam assembly is provided at an end of an arm of the cam assembly extending in a direction having an inclination with respect to the horizon.

According to an embodiment, the arm extends upwardly and away from an upper end of the guiding slot.

According to an embodiment, the guiding slot has its four contiguous segments form a flattened-M shape.

According to an embodiment, the flattened-M shape of the guiding slot extends on average in a direction having an inclination substantially the same as an inclination in which the arm extends.

According to an embodiment, the hi-rail device comprises only one hydraulic cylinder.

According to an embodiment, there is further provided a blocker secured to the cam assembly for receiving the axle assembly and comprising an elastic material for dampening vibrations thereof when in the stowed position.

According to an embodiment, at least one of the axle locking slot and the guiding slot has a contour thereof made of a material more resistant to wear than a material forming the locking pin.

According to an embodiment, at least one of the axle locking slot and the guiding slot has a contour thereof made of a material more resistant to wear than a material forming a remainder of the cam assembly.

According to another aspect of the invention, there is provided a hi-rail device comprising:
- a cam assembly comprising a guiding slot and, the guiding slot comprising a plurality of contiguous segments extending as a broken line from a lower end thereof to an upper end thereof, wherein a first one and a last one of the plurality of contiguous segments extend in a downward slope with respect to a horizon;
- a locking pin inserted in the guiding slot and movable in translation within the guiding slot in which it is inserted;
- an axle assembly in which the locking pin is inserted, the axle assembly having a weight applied on the locking pin, the weight locking the locking pin in the lower end or the upper end of the guiding slot if the locking pin is in the first one or the last one of the four contiguous segments and no other force is applied thereonto.

According to an embodiment, the cam assembly further comprises an arm extending away and upwardly from the guiding slot.

According to an embodiment, the arm has an inclination substantially the same as an inclination between the lower end and the upper end of the guiding slot.

According to an embodiment, there is further provided a hydraulic cylinder, pivotally connected to a fixed point on the arm of the cam assembly and fixedly connected to the locking pin to provide a translation movement thereto and to unlock the locking pin from the first one or the last one of the plurality of contiguous segments in which the weight of the axle assembly otherwise locks the locking pin.

According to an embodiment, the axle assembly is pivotally connected at a connection pin on the cam assembly, the axle assembly comprising an axle locking slot through which the locking pin is inserted to drive the axle assembly in rotation with respect to the connection pin on the cam assembly when the locking pin undergoes the translation movement provided by the hydraulic cylinder.

According to an embodiment, the guiding slot comprises four contiguous segments, sequentially: a lower one of the end segments, namely a lower detent segment, a lower coupling segment, an upper coupling segment and an upper one of the end segments, namely an upper detent segment, each pair of adjacent segments extending in different directions, thereby forming the broken line.

According to an embodiment, the guiding slot has its four contiguous segments form a flattened-M shape.

According to an embodiment, the hi-rail device comprises only one hydraulic cylinder.

According to an embodiment, there is further provided a blocker secured to the cam assembly for receiving the axle assembly and comprising an elastic material for dampening vibrations thereof when in the stowed position.

According to an embodiment, at least one of the axle locking slot and the guiding slot has a contour thereof made of a material more resistant to wear than a material forming the locking pin.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
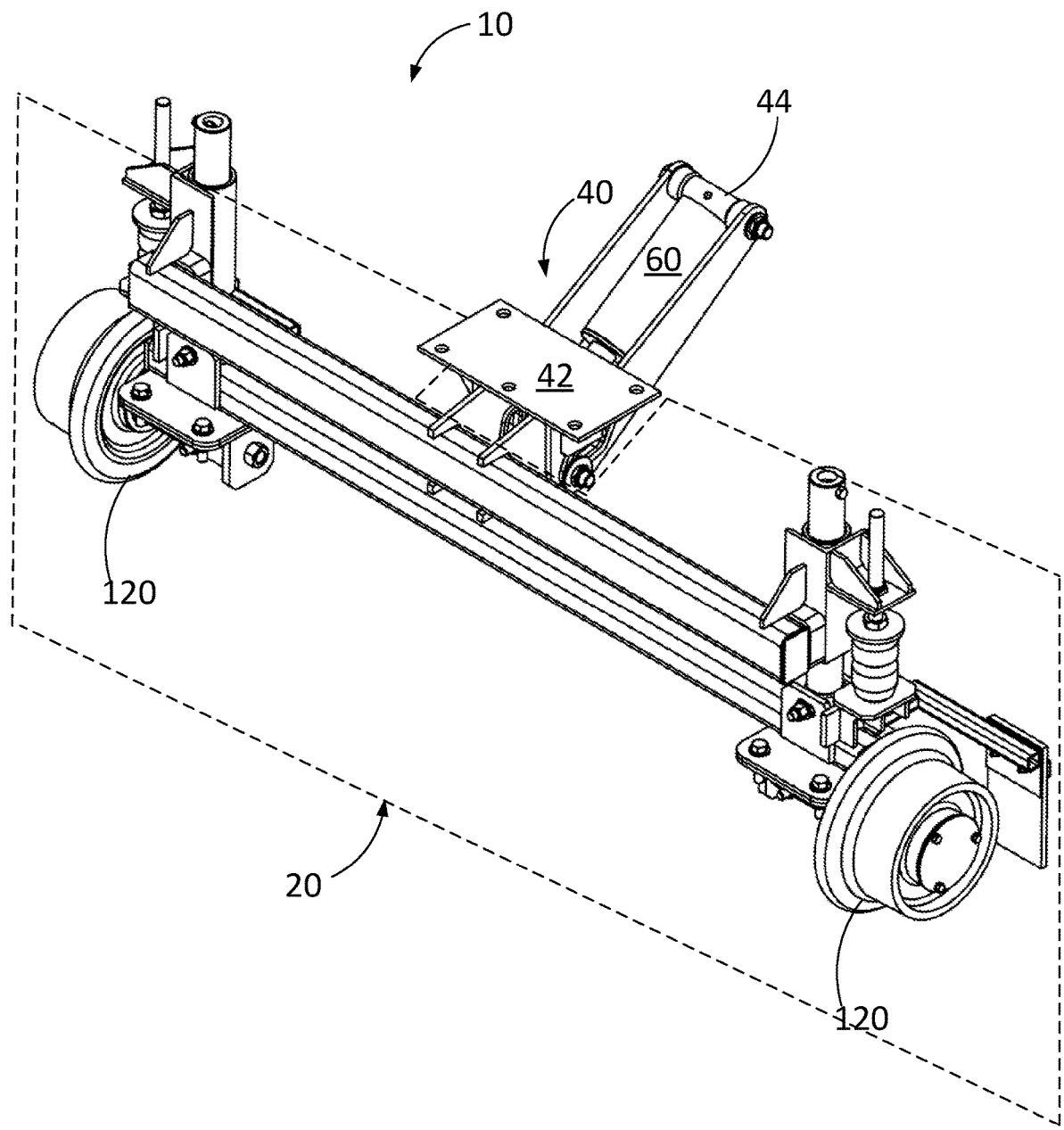
FIG. 1 is a front perspective view illustrating a hi-rail device, according to an embodiment of the present invention.
Figure 2:
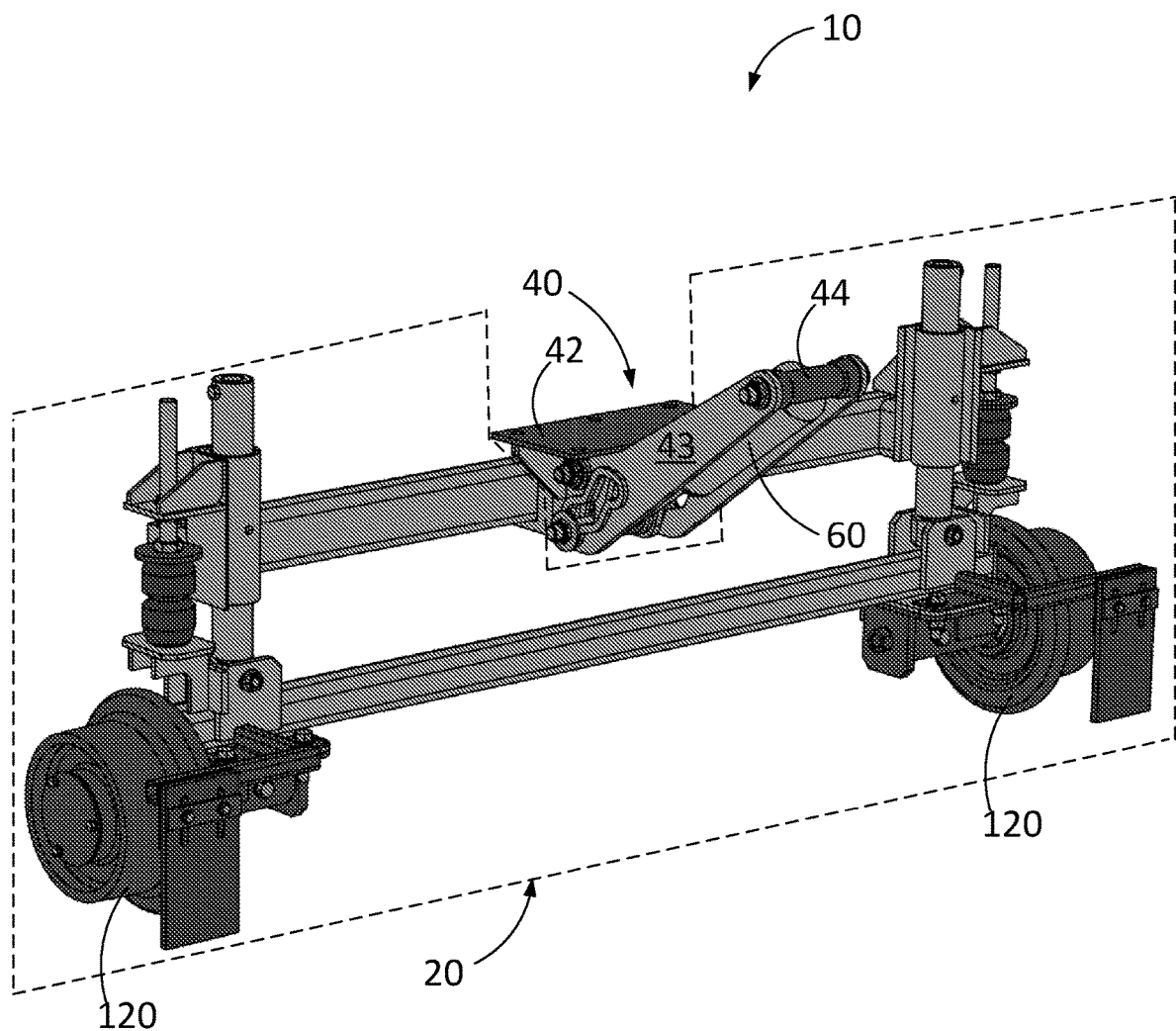
FIG. 2 is a rear perspective view illustrating the hi-rail device of FIG. 1.

Referring to FIGS. 1-2, there is shown a hi-rail device 10. The hi-rail device 10 is a device that is usually provided as two units installed on the front and back of a vehicle (e.g., a pick-up truck) to allow the vehicle to travel on rail.

The hi-rail device 10 can adopt two positions: a rail position (or deployed position), shown in FIGS. 1-7 and 11, and a road position (or stowed position), shown in FIGS. 8-10 and 12. In the former case, flanged rail wheels 120 extend downwardly to contact the rail tracks, while in the latter case, the rail wheels 120 are lifted up to avoid contact with the road so the vehicle can move on its tires only. The rail wheels 120 can support some of the weight of the vehicle (usually a fraction thereof). This is usually (but not necessarily) a secondary function as the primary function of the rail wheels is to serve as guide wheels to prevent derailing when moving on rail tracks.

For safety reasons, the hi-rail device 10 needs to be locked in place in both positions. While hi-rail devices usually depend on hydraulic pressure in a cylinder to be locked in a given position, the hi-rail device 10 described herein can be locked in a purely mechanical fashion (i.e., based on a simple mechanism comprising only pins and slots and not involving hydraulics) and, advantageously, not relying on hydraulic pressure in the cylinder. In other words, the locking does not involve actuators, which require power sources. No external power source, outside gravity, is needed to provide and maintain locking; the weight of parts and their arrangement is sufficient to maintain locking. This is therefore advantageous over other devices which require hydraulic power, or other power source, to maintain parts locked. Indeed, hydraulic failure in rail position, when relying on hydraulics pressure, can lead to the hi-rail unit collapsing and retracting. If this occurs while the vehicle is in motion, this will lead to derailing of the vehicle. Furthermore, failure of hydraulic pressure in the cylinder in road position can lead to the hi-rail deploying while the vehicle in motion, which can cause loss of steering and major failure. The embodiments described herein do not require such an external power source to maintain the locking, especially in road position, and are thus safer. Actuators such as hydraulic actuators are used for switching the position of the axle assembly 20 between deployed and stowed, but the axle assembly 20 can remain locked in the deployed or stowed position even if there is a power failure in the actuator.

As shown in FIGS. 1-2, the hi-rail device 10 comprises a cam assembly 40, which is fixed with respect to the vehicle, and an axle assembly 20 holding the wheels 120, where the axle assembly 20 can rotate with respect to the cam assembly 40 to switch between the rail position and the road position.

Figure 3:
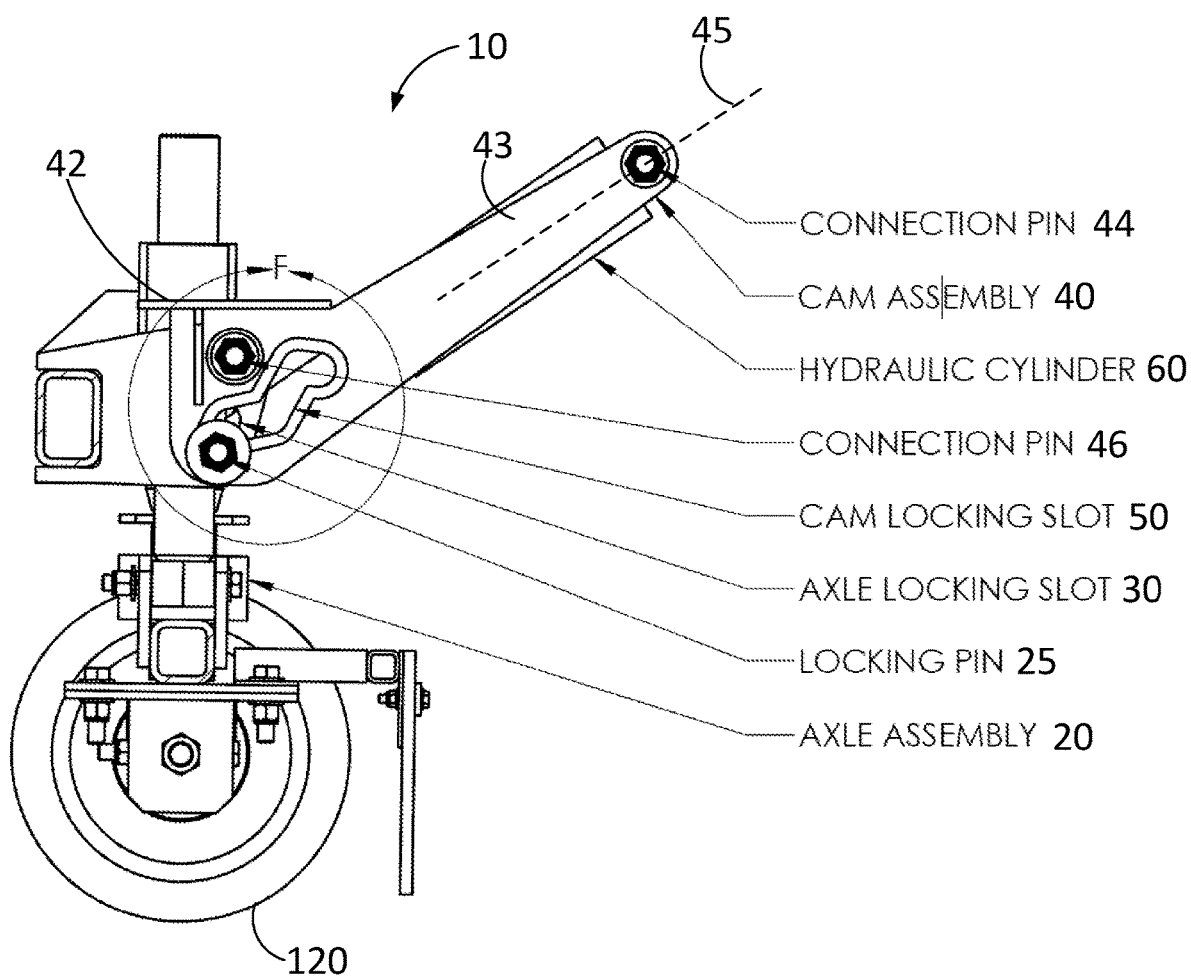
FIG. 3 is a section view illustrating a hi-rail device in rail position, according to an embodiment of the present invention.
Figure 4:
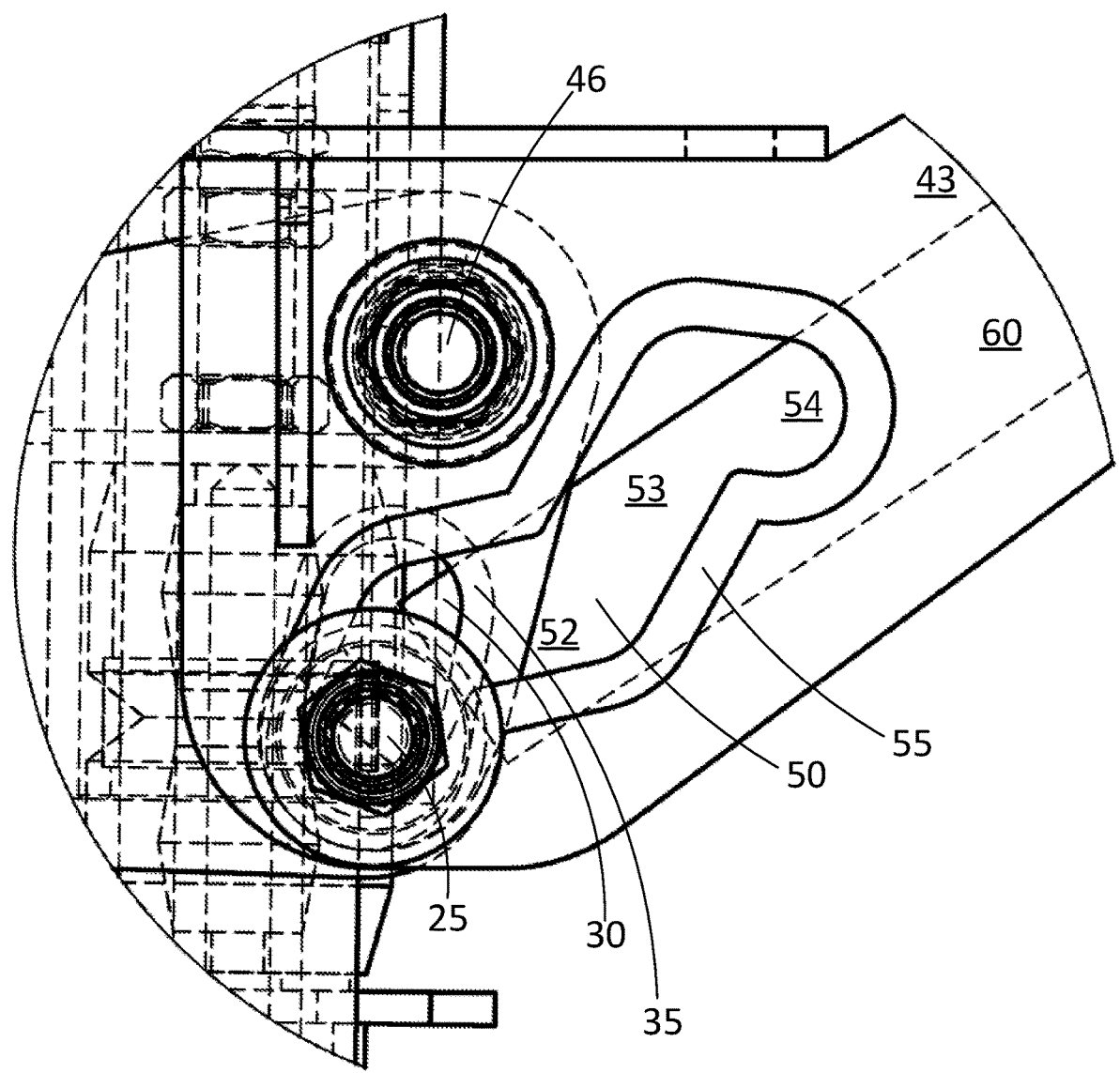
FIG. 4 is a section view illustrating a portion of the hi-rail device of FIG. 3.
Figure 5:
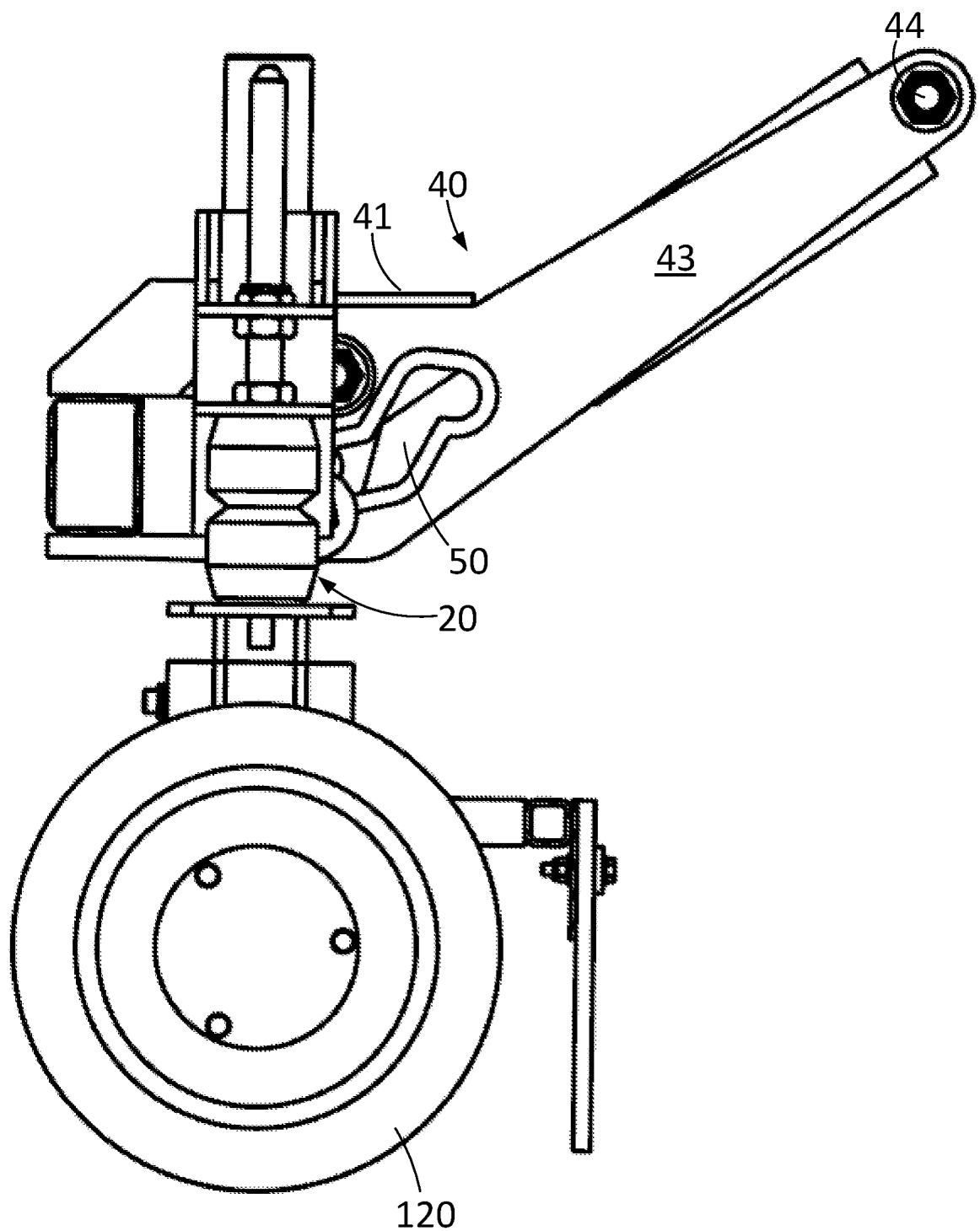
FIG. 5 is a side view illustrating a hi-rail device in rail position, according to an embodiment of the present invention.
Figure 6:
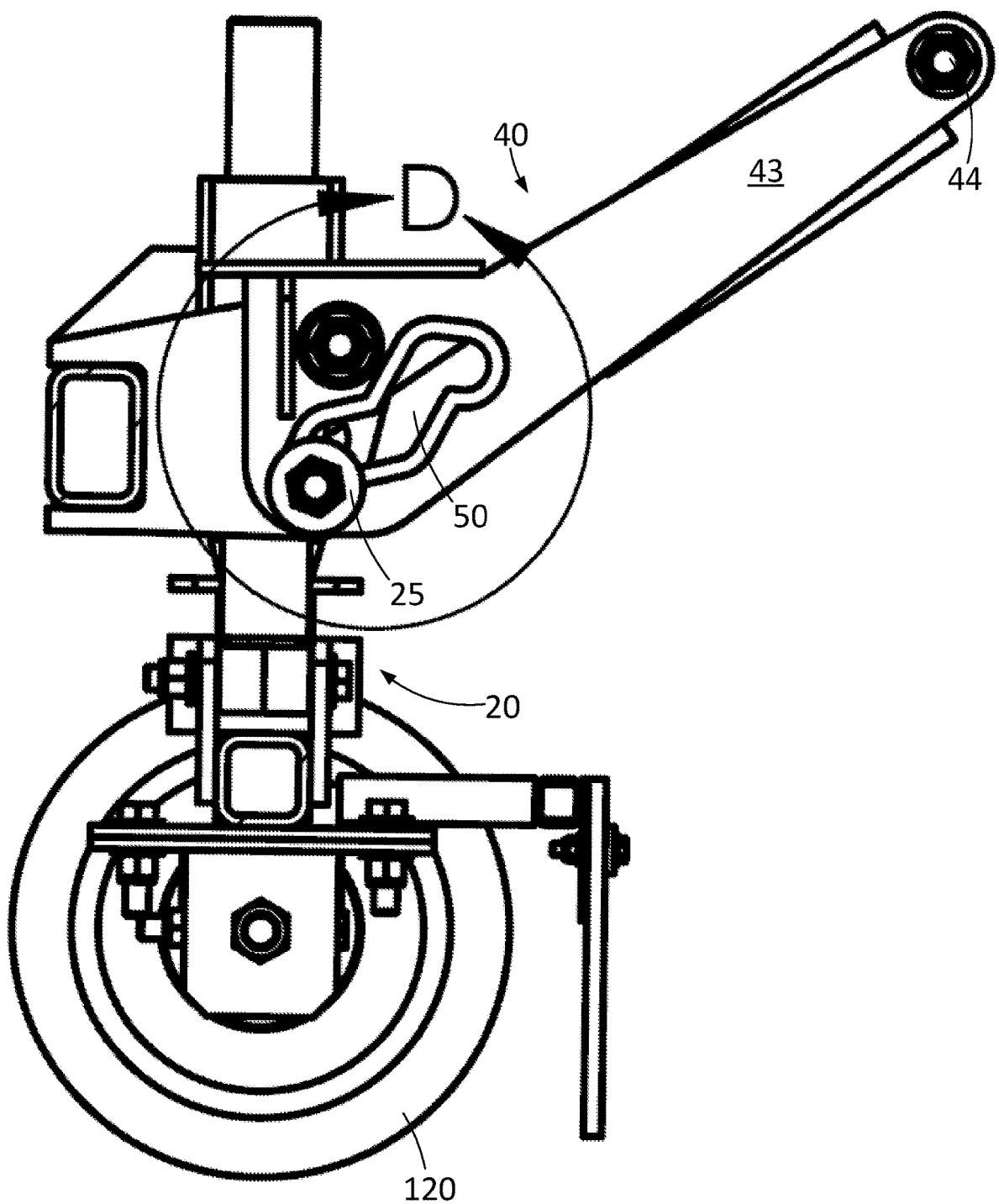
FIG. 6 is a section view illustrating the hi-rail device of FIG. 5.
Figure 7:
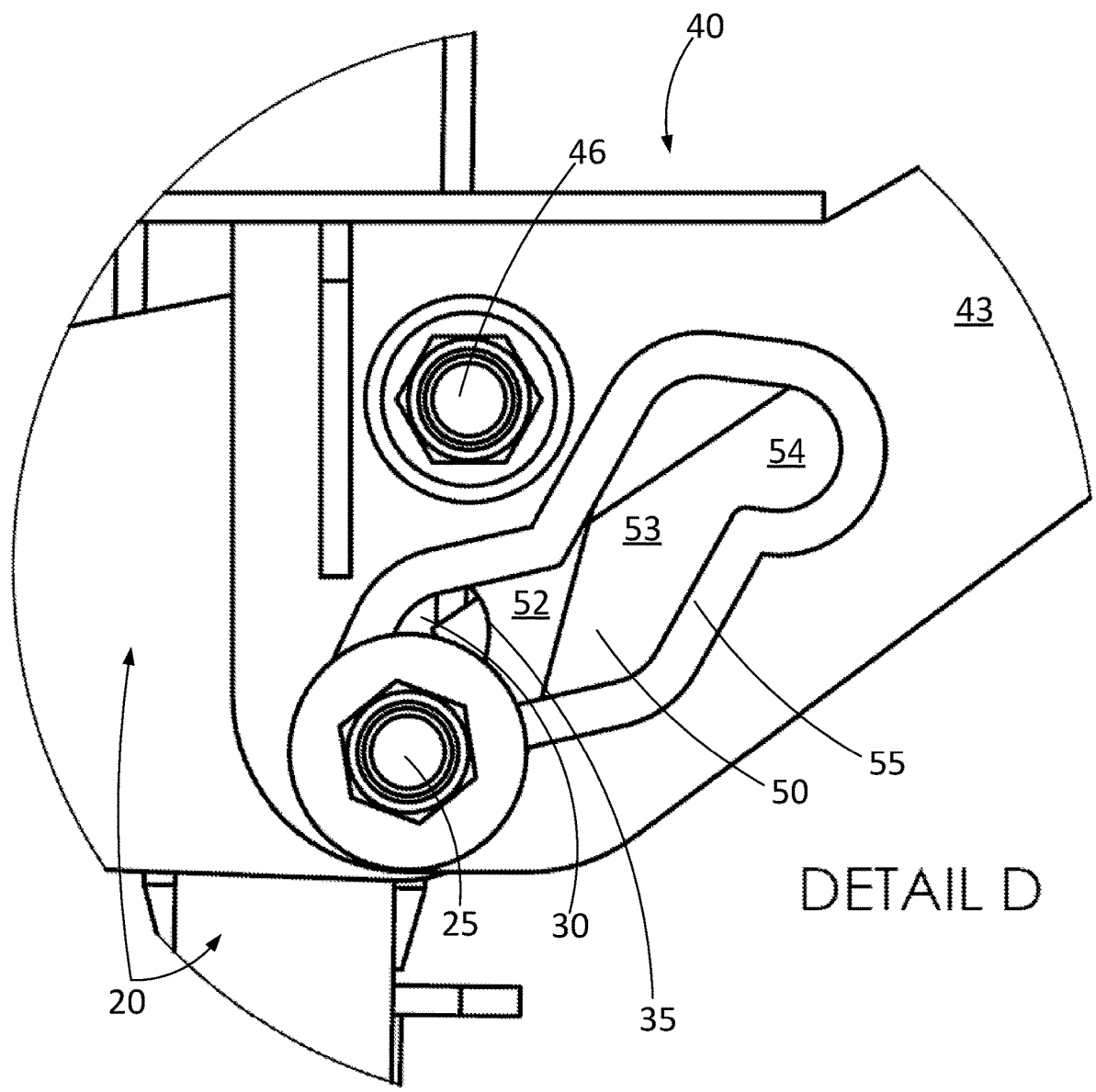
FIG. 7 is a section view illustrating a portion of the hi-rail device of FIG. 6.
Figure 8:
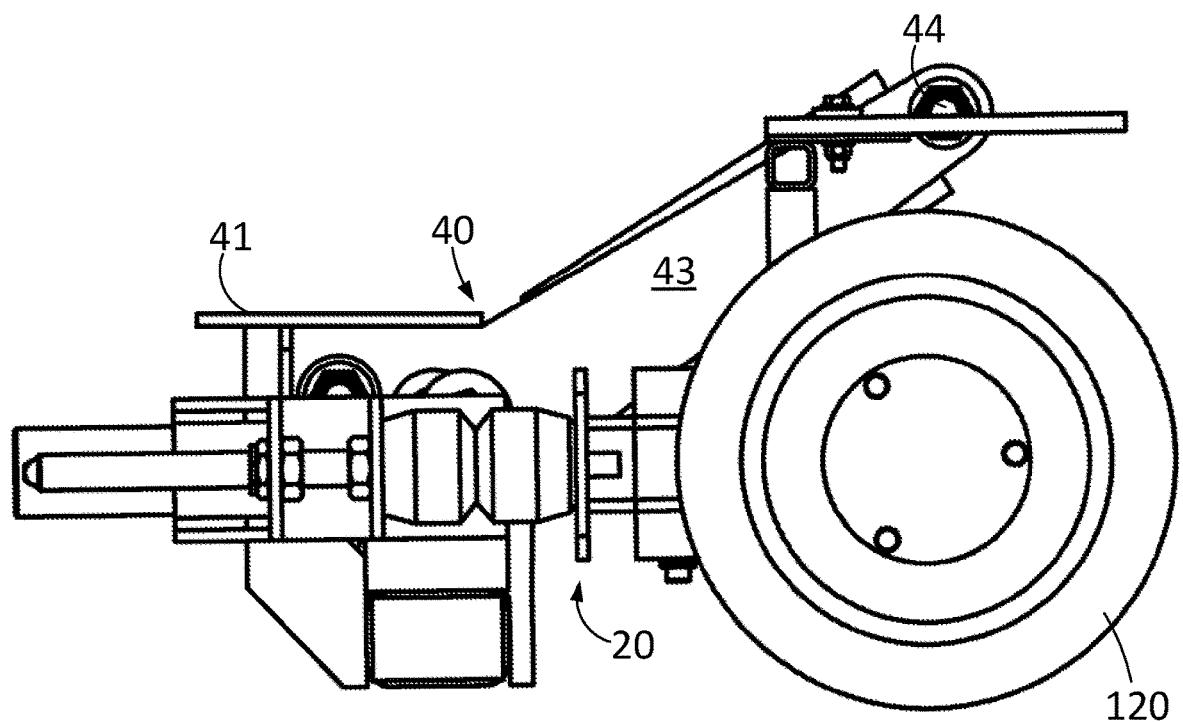
FIG. 8 is a side view illustrating a hi-rail device in road position, according to an embodiment of the present invention.
Figure 9:
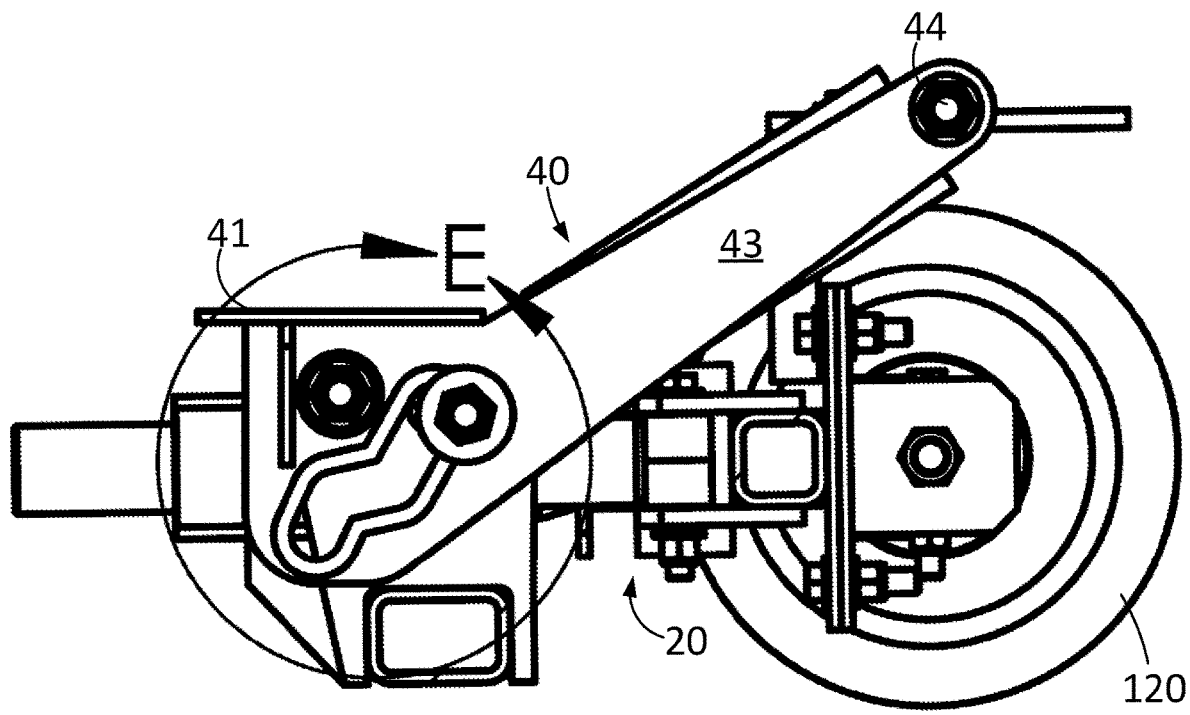
FIG. 9 is a section view illustrating the hi-rail device of FIG. 8.
Figure 10:
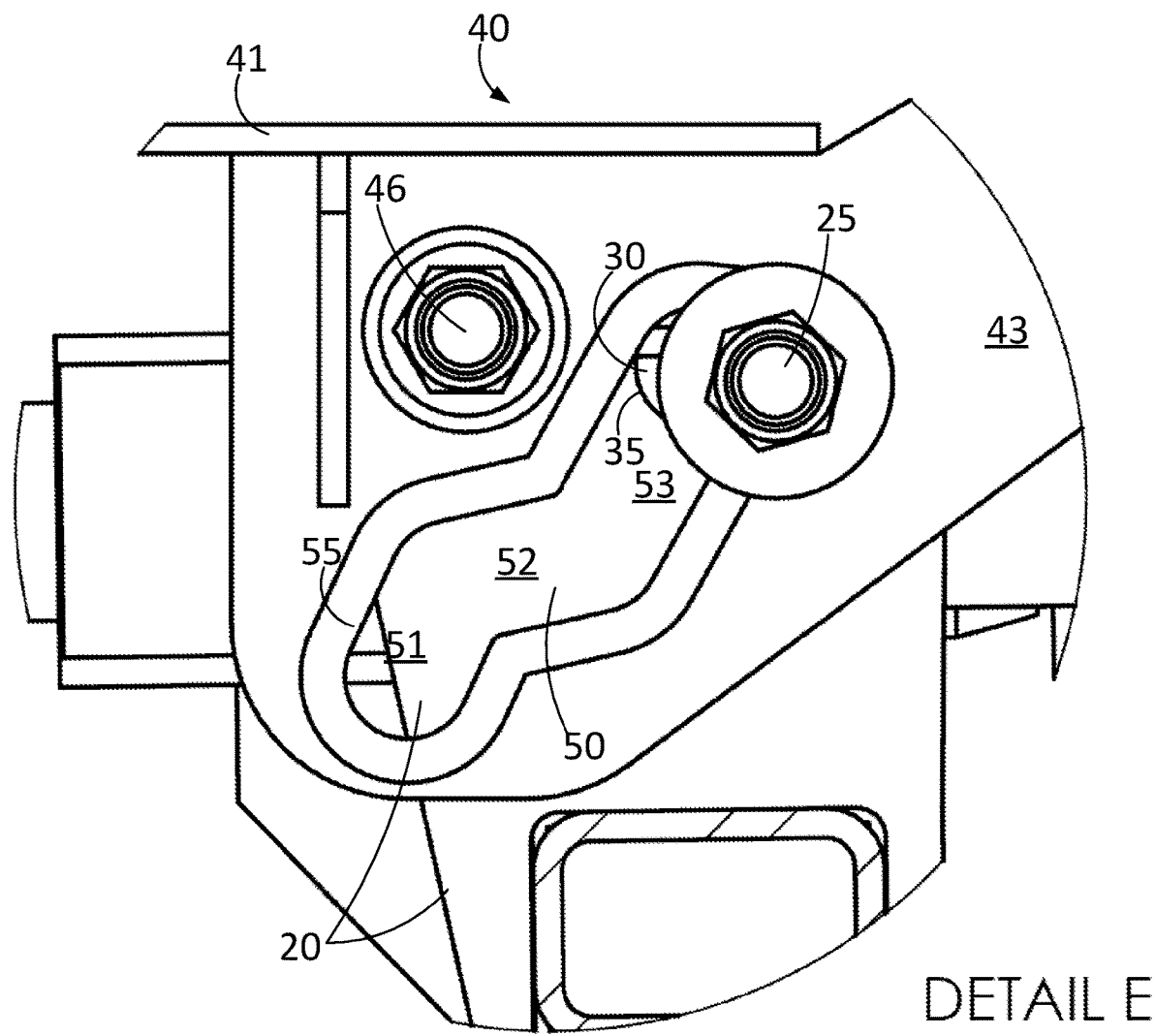
FIG. 10 is a section view illustrating a portion of the hi-rail device of FIG. 9.

As shown in FIGS. 3-4, the axle assembly 20 is connected to a pivot point, i.e., the connection pin 46, on the cam assembly 40 to allow such a rotation around this pivot point. A single hydraulic cylinder 60, in a central position, can extend and retract and is therefore used indirectly to drive the rotation by lengthening or shortening, under hydraulic actuation, the distance between the two ends of the hydraulic cylinder 60, where mechanical constraints are applied to the location of these ends of the hydraulic cylinder 60. More specifically, the hydraulic cylinder 60 has one of its ends, defined as the upper end, pivotally connected at a fixed distal end of the cam assembly 40 and the other one of its ends, defined as the lower end, fixedly connected to a locking pin 25 which is movable only in translation within a guide rail or guiding slot. According to some embodiments, more than one hydraulic cylinder, in a central locking position could be used in the present invention. The locking pin 25 is at the mobile lower end of the hydraulic cylinder 60 which drives its translation; it is driven along a guiding slot, defined as the cam locking slot 50, formed within the walls of the cam assembly 40 to imprint a predefined trajectory to the locking pin 25 as it is pulled or pushed by the hydraulic cylinder 60. The predefined trajectory of the locking pin 25 is the shape of the cam locking slot 50. The locking pin 25 is also engaged within a slot in the axle assembly 20, defined as the axle locking slot 30, to drive the rotation of the axle assembly 20 with respect to its pivot point, namely the connection pin 46. The cam locking slot 50 is also shaped to allow the locking pin 25 to disengage from the axle assembly 20 and being mechanically confined in one of the ends of the cam locking slot 50 for locking purposes when the axle assembly 20 has reached either the rail position or the road position. The cam locking slot 50 is also reinforced around its perimeter (e.g., by using additional metal thickness, or by adding a coating, or any equivalent) to ensure minimal wear in order to maintain over time the original predefined trajectory for the locking pin 25. For example, the contour of all slots can comprise a reinforcement made of a metal having greater resistance to wear or deformations.

The cam assembly 40 comprises a mounting device 42 for installing and securing the hi-rail device 10 on/under the vehicle at appropriate locations thereon. A custom mounting kit (i.e. frame, brackets, etc.) is manufactured to fit the exact application (which changes from truck to truck). The cam assembly 40 is overall fixed; it does not substantially move with respect to the vehicle. The cam assembly 40 has an arm 43 extending upwardly and horizontally away from the mounting device 42. The arm axis 45 therefore has an inclination with respect to the horizontal. The arm 43 has an upper distal end where a connection pin 44 is used to hold in place the upper end of the hydraulic cylinder 60. The hydraulic cylinder 60 substantially extends along the arm 43 and therefore has an inclination along the arm axis 45. The inclination of the hydraulic cylinder 60 is expected to vary within a limited range (and thus not be exactly on the arm axis 45 at all times) depending on the extension or retraction of the cylinder 60, since the lower end of the hydraulic cylinder 60 is connected to a locking pin 25 which is guided within a cam locking slot 50, which is a broken-line opening performed in the side walls of the cam assembly 40. The cam locking slot 50 has a flattened M-shape substantially following the inclination of the arm 43 but not strictly following the arm axis 45 because it is a broken line, i.e., it is made of contiguous and sequential segments having different inclinations with respect to the neighboring segment, or in other words, each pair of adjacent segments has different inclinations. However, the average inclination of all four contiguous segments, or in other words, the vector between the two ends of the cam locking slot 50, is about the same as the average inclination of the hydraulic cylinder 60 and thus has the permanent inclination of the arm axis 45.

The hi-rail device 10 is actuated hydraulically from the road position (stowed) to the rail position (deployed). The hi-rail device 10 is further illustrated in rail position in FIGS. 5-7 and 10, and in road position in FIGS. 8-10 and 12.

The hi-rail device 10 features a single hydraulic cylinder 60, controlled for example by a hydraulic control valve that drives the locking pin 25 for the hi-rail device 10 to deploy. The locking pin 25 is captive in the bushing at the lower end of the hydraulic cylinder 60 and travels only within the cam locking slot 50 to define its translation trajectory. The locking pin 25 is also captive in the axle locking slot 30 to drive the movement of the axle assembly 20; since the axle assembly 20 is pivotally connected to the connection pin 46, the translation of the locking pin 25 pushing on a contour 35 of the axle locking slot 30 under the force of the hydraulic cylinder 60 provides the needed rotation movement of the axle assembly 20.

The cam locking slot 50 has four distinct segments: a lower detent segment 51, a lower coupling segment 52, an upper coupling segment 53 and an upper detent segment 54. These four segments form a continuous opening defined by the contour 55 of the cam locking slot 50. Together, they give to the cam locking slot 50 a flattened M-shape having the inclination of the arm of the cam assembly 40. The detent segments 52, 54 are the end segments, i.e., the segments that comprise one of the two ends where the locking pin 25 is locked to define the deployed position and the stowed position. The contour 55 of the cam locking slot 50 serves as a guide for the locking pin 25, which can move only within the bounds of the contour 55. When the hydraulic cylinder 60 pushes on the locking pin 25 or pulls it, the locking pin 25 is urged on the contour 55 which changes the trajectory of the locking pin 25 to follow the shape of the cam locking slot 50 (e.g., a broken-line or flattened M shape) instead of a purely single-line trajectory.

According to some embodiments, the slots (i.e. for both the cam and the axle) may be reinforced with higher grade steel along their perimeter. Most parts of the hi-rail device 10 (including the cam plates) may be manufactured out of mild steel, with the exception of the pins (C-1045 steel) and the slot reinforcements (T100 steel). The purpose of the T100 steel is to minimize wear on the cam and axle slots. The purpose of the C-1045 steel is to offer better tensile strength to the pins to their prevent deformation. The purpose of combining the two different materials is to provide longevity of the hi-rail device 10. The T100 steel is of higher grade (i.e., tensile and yield strengths, hardness) than the C-1045 steel, such that over time, the pins could wear before the main structural assemblies (cam, axle), allowing easier and cheaper maintenance on the unit.

When the locking pin 25 travels in the lower coupling segment 52 and the upper coupling segment 53, the slots 30 and 50 are coupled because the locking pin 25 is engaged with the axle assembly 20. More specifically, when the locking pin 25 is driven while being in the lower coupling segment 52 or the upper coupling segment 53, it also urges the contour 35 of the axle locking slot 30. It means that a movement of the locking pin 25 while being in the lower coupling segment 52 or the upper coupling segment 53 implies a movement of the axle locking slot 30 and therefore a rotation of the axle assembly 20 with respect to the pivot point at the connection pin 46 (and, since the connection pin 46 is fixed on the cam assembly 40, rotation of the axle assembly 20 with respect to the cam assembly 40). Moreover, to provide coupling within any one of the coupling segments 52, 53, it implies that while the locking pin 25 has its translation guided by the guiding slot, the weight of the axle assembly 20 is applied onto the locking pin 25 via the contour 35 of the axle locking slot 30 in a direction that is not locally normal to the contour 55 of the cam locking slot 50. This condition implies that a movement of the locking pin 25 within the cam locking slot 50, acting as the guiding slot, forces the locking pin 25 to push against the contour 35 of the axle locking slot 30 which applies the weight of the axle assembly 20 thereonto.

When the locking pin 25 travels in the lower detent segment 51 or the upper detent segment 54, the slots 30 and 50 are uncoupled since the locking pin 25 is disengaged from the axle locking slot 30. More specifically, when the locking pin 25 is driven while being in the lower detent segment 51 or the upper detent segment 54, it does not urge the contour 35 of the axle locking slot 30; it rather translates freely inside the axle locking slot 30. It means that a movement of the locking pin 25 while being in the lower detent segment 51 or the upper detent segment 54 implies there are no movement of the axle locking slot 30 and therefore no rotation of the axle assembly 20.

Furthermore, when the locking pin 25 is in the lower detent segment 51 or the upper detent segment 54, the hi-rail device 10 is said to be locked because a substantial force is required to move the locking pin 25 out from the lower detent segment 51 or from the upper detent segment 54 into the lower coupling segment 52 or the upper coupling segment 53 (i.e., to be unlocked) to initiate the rotation of the axle assembly 20. Conversely, once the locking pin 25 enters any one of the lower detent segment 51 and from the upper detent segment 54, it spontaneously falls into the bottom of this detent segment under the action of gravity and is thereby captured by this detent segment, thanks to a downward slope.

Indeed, if the locking pin 25 is in the lower detent segment 51, it is locked therein, any exit of the locking pin 25 from the lower detent segment 51 would require an upward movement and the locking pin 25 is held down by the weight of the axle assembly 20. Also, the locking pin 25 is held in the rail position by having the axle assembly 20 over-center.

Alternatively, if the locking pin 25 is driven into the upper detent segment 54, a downward slope is provided to prevent the exit of the locking pin 25 therefrom. Indeed, any exit of the locking pin 25 from the upper detent segment 51 would require an upward movement and the locking pin 25 is held down by the weight of the axle assembly 20.

This allows for the axle locking to be purely mechanical and not relying on pressure in the single hydraulic cylinder 60. Therefore, actuating the hydraulic cylinder 60 unlocks the axle assembly 20 from its current position (road or rail position), rotates it to the other position (rail or road position, respectively) and locks it in place, all in one fluid motion. However, should the power source of such actuator stop or be disabled when the axle assembly 20 is locked, either deployed or stowed, the axle assembly 20 remains locked. The weight of the axle assembly 20 maintains the axle assembly 20 locked at its position.

The slope of the lower detent segment 51 can be very steep, almost vertical, because the hydraulic cylinder 60 can easily pull the locking pin 25 out from the lower detent segment 51 to unlock the locking pin 25 even though the slope is almost vertical. Thus, in a deployed position, the locking pin 25 is held in the rail position by having the axle assembly 20 over-center. However, the locking pin 25 needs to be pushed out from the upper detent segment 54 by the hydraulic cylinder 60 to unlock the locking pin 25, but a steep slope would block any pushing movement on the locking pin 25. Therefore, the downward slope of the upper detent segment 54 is less steep that the downward slope of the lower detent segment 51.

Automatic locking in a central position is an advantage over known devices as the hi-rail device 10 of the present invention does not rely on hydraulics (or other power sources) to lock the hi-rail device 10 in stowed or deployed positions. The known hi-rail devices generally rely on hydraulics pressure of the cylinders and over-center for the deployed position and some also have mechanical pins. They mostly rely on mechanical locking for the stowed position (using hooks, pins, latches), while some have hydraulic holding valves as well. These mechanical means of locking can often break because the hydraulic force produced to deploy the hi-rail is normally greater than the force needed to power through the locks. The means of actuating these locks can vary, but most come with problems: air pressure actuated locking pins have weak air cylinder rods, can leak air and become ineffective and are most times not strong enough to pull the pins out if frozen, seized or under shear. This often requires the user to crawl under the truck to reach the pins and manually actuate them with a blunt force. Hydraulically actuated locking pins are often too strong and can cause damage if misaligned. Also, both offer no means of positively identifying a proper and complete engagement of the locks. Cable actuated pins and/or hooks may have long term reliability issues, as the cable(s) get(s) corroded by water/salt/brine, and become(s) weaker and break when pulled to overcome the force required to actuate a seized locking component.

In general, automatic locking as contemplated herein is more user friendly, as it necessitates only the single operation of a lever to lock and unlock, and deploy and stow). They are safer to use, since if the apparatus stows or deploys properly, it also means that it locks or unlocks properly. They also require less maintenance, as there are no separate mechanisms to grease, or to adjust.

Figure 11:
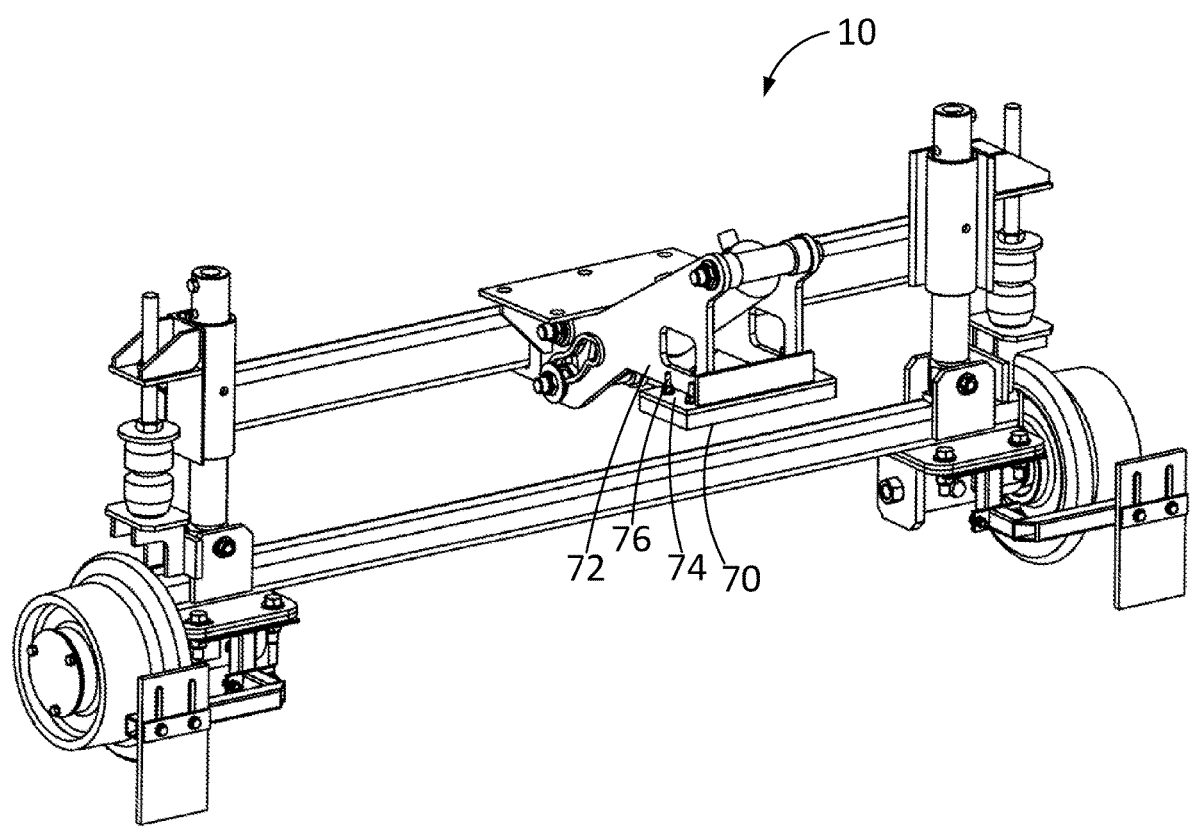
FIG. 11 is a rear perspective view illustrating a hi-rail device, which comprises a rubber blocker, in rail or deployed position, according to an embodiment of the present invention.
Figure 12:
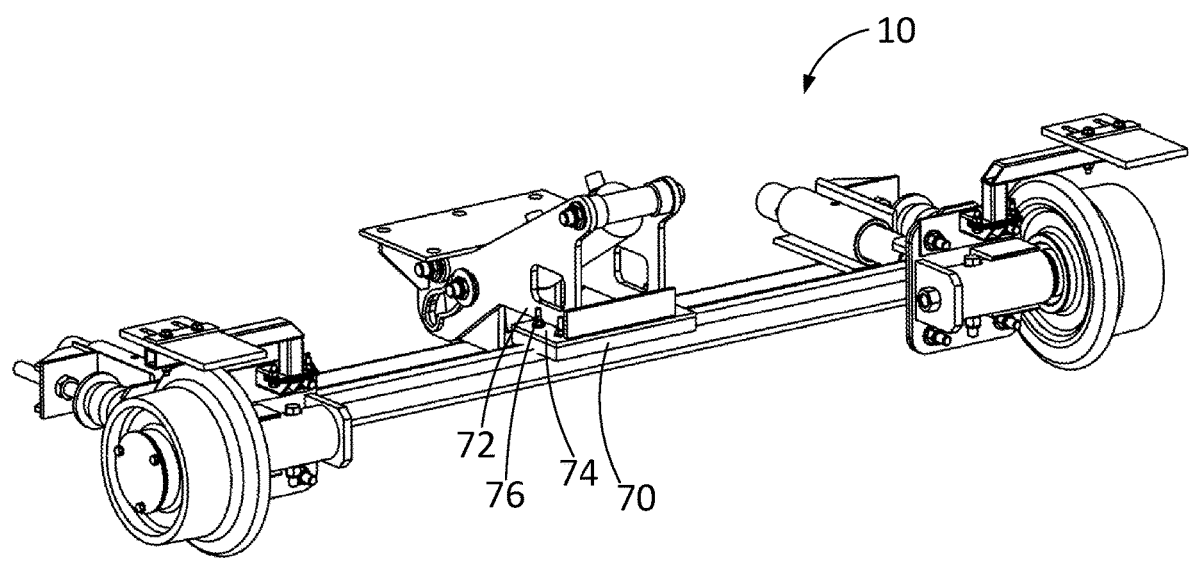
FIG. 12 is a rear perspective view illustrating a hi-rail device, which comprises a rubber blocker, in road or stowed position, according to an embodiment of the present invention.

According to another embodiment, as shown in FIGS. 11-12, there is provided a blocker 70. According to a more specific embodiment, the blocker 70 comprises rubber, or may be substantially entirely made of a resilient or elastic material such as rubber, in order to absorb shocks and dampen the arrival of the axle assembly 20 at its stowed or road position.

The blocker 70 is attached to the cams to absorb vibrations from the vehicle when the hi-rail device 10 is in road position, travelling on damaged or gravel roads. Indeed, severe vibrations can cause premature wear on the pins and weldments such as the cam assembly, frame and axle.

According to an embodiment, as shown in FIGS. 11-12, the blocker 70 is mounted under a plate 74, and can be secured thereto with bolts 76, such as 4 bolts. The plate itself is secured to a mounting portion 72 of the cam plate.

According to an embodiment, the blocker 70 is designed (by selecting appropriate thickness and elasticity) and positioned to be compressed by about ⅛" (3.175 mm) when the axle is in road position. This compression pushes back on the axle assembly 20, as shown in FIG. 12, and takes up the play in the mechanism's pivots and pins.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A hi-rail device comprising:
a cam assembly for mounting on a vehicle, the cam assembly comprising a guiding slot, the guiding slot comprising two end segments having a downward slope with respect to a horizon;
a locking pin movable in translation within the guiding slot in which the locking pin is inserted, the locking pin being lockable by weight in the two end segments of the guiding slot;
a hydraulic cylinder, pivotally connected to a fixed point on the cam assembly and fixedly connected to the locking pin to provide a translation movement thereto; and
an axle assembly for holding wheels, the axle assembly being pivotally connected at a connection pin on the cam assembly, the axle assembly comprising an axle locking slot through which the locking pin is inserted to drive the axle assembly in rotation with respect to the connection pin on the cam assembly when the locking pin undergoes the translation movement.

2. The hi-rail device of claim 1, wherein the guiding slot comprises four contiguous segments, sequentially: a lower one of the end segments, namely a lower detent segment, a lower coupling segment, an upper coupling segment and an upper one of the end segments, namely an upper detent segment, each pair of adjacent segments extending in different directions.

3. The hi-rail device of claim 2, wherein the fixed point on the cam assembly is provided at an end of an arm of the cam assembly extending in a direction having an inclination with respect to the horizon.

4. The hi-rail device of claim 3, wherein the arm extends upwardly and away from an upper end of the guiding slot.

5. The hi-rail device of claim 4, wherein the guiding slot has four contiguous segments that form a flattened-M shape.

6. The hi-rail device of claim 5, wherein the flattened-M shape of the guiding slot extends on average in a direction having an inclination substantially the same as an inclination in which the arm extends.

7. The hi-rail device of claim 6, wherein the hi-rail device comprises only one hydraulic cylinder.

8. The hi-rail device of claim 1, further comprising a blocker secured to the cam assembly for receiving the axle assembly and comprising an elastic material for dampening vibrations thereof when in the stowed position.

9. The hi-rail device of claim 1, wherein at least one of the axle locking slot and the guiding slot has a contour thereof made of a material more resistant to wear than a material forming the locking pin.

10. The hi-rail device of claim 1, wherein at least one of the axle locking slot and the guiding slot has a contour thereof made of a material more resistant to wear than a material forming a remainder of the cam assembly.

11. A hi-rail device comprising:
a cam assembly comprising a guiding slot, the guiding slot comprising a plurality of contiguous segments extending as a broken line from a lower end thereof to an upper end thereof, wherein a first one and a last one of the plurality of contiguous segments extend in a downward slope with respect to a horizon;
a locking pin inserted in the guiding slot and movable in translation within the guiding slot in which the locking pin is inserted; and
an axle assembly in which the locking pin is inserted, the axle assembly having a weight applied on the locking pin, the weight locking the locking pin in the lower end or the upper end of the guiding slot if the locking pin is in the first one or the last one of the plurality of contiguous segments and no other force is applied thereonto.

12. The hi-rail device of claim 11, wherein the cam assembly further comprises an arm extending away and upwardly from the guiding slot.

13. The hi-rail device of claim 12, wherein the arm has an inclination substantially the same as an inclination between the lower end and the upper end of the guiding slot.

14. The hi-rail device of claim 13, further comprising a hydraulic cylinder, pivotally connected to a fixed point on the arm of the cam assembly and fixedly connected to the locking pin to provide a translation movement thereto and to unlock the locking pin from the first one or the last one of the plurality of contiguous segments in which the weight of the axle assembly otherwise locks the locking pin.

15. The hi-rail device of claim 14, wherein the axle assembly is pivotally connected at a connection pin on the cam assembly, the axle assembly comprising an axle locking slot through which the locking pin is inserted to drive the axle assembly in rotation with respect to the connection pin on the cam assembly when the locking pin undergoes the translation movement provided by the hydraulic cylinder.

16. The hi-rail device of claim 14, wherein the guiding slot comprises four contiguous segments, sequentially: a lower one of the end segments, namely a lower detent segment, a lower coupling segment, an upper coupling segment and an upper one of the end segments, namely an upper detent segment, each pair of adjacent segments extending in different directions, thereby forming the broken line.

17. The hi-rail device of claim 16, wherein the guiding slot has four contiguous segments that form a flattened-M shape.

18. The hi-rail device of claim 14, wherein the hi-rail device comprises only one hydraulic cylinder.

19. The hi-rail device of claim 11, further comprising a blocker secured to the cam assembly for receiving the axle assembly and comprising an elastic material for dampening vibrations thereof when in the stowed position.

20. The hi-rail device of claim 11, wherein at least one of the axle locking slot and the guiding slot has a contour thereof made of a material more resistant to wear than a material forming the locking pin.

* * * * *